(12) United States Patent
Quitmeyer et al.

(10) Patent No.: US 7,093,696 B2
(45) Date of Patent: Aug. 22, 2006

(54) AIRCRAFT BRAKE ACTUATOR THERMAL INSULATOR AND TANGENTIAL MOVEMENT COMPENSATOR

(75) Inventors: James N. Quitmeyer, Chandler, AZ (US); Donald J. Christensen, Phoenix, AZ (US); Kellan P. Geck, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/973,572

(22) Filed: Oct. 25, 2004

(65) Prior Publication Data

US 2006/0086576 A1 Apr. 27, 2006

(51) Int. Cl.
*F16D 55/00* (2006.01)
(52) U.S. Cl. .................. 188/71.1; 188/206 R
(58) Field of Classification Search ........... 188/71.4, 188/71.5, 71.6, 72.1, 72.3, 72.4, 72.5, 72.6, 188/73.1, 73.2, 205 A, 206 R, 71.1, 73.31, 188/73.35, 73.36, 73.37
See application file for complete search history.

(56) References Cited

U.S. PATENT DOCUMENTS

| | | | |
|---|---|---|---|
| 2,240,219 A | 4/1941 | Lambert | |
| 2,794,521 A | 6/1957 | Morrison | |
| 3,158,230 A | 11/1964 | Chouings | |
| 3,182,754 A | 5/1965 | Hahm et al. | |
| 3,315,769 A | 4/1967 | Francois | |
| 3,693,765 A * | 9/1972 | Hikida et al. | 188/72.5 |
| 3,900,083 A * | 8/1975 | Hauth | 188/72.6 |
| 4,147,241 A | 4/1979 | Preniczny et al. | |
| 4,412,603 A | 11/1983 | Bischoff | |
| 4,513,844 A | 4/1985 | Hoffman, Jr. | |
| 4,848,291 A | 7/1989 | Kawamura et al. | |
| 6,003,640 A * | 12/1999 | Ralea | 188/71.5 |
| 6,257,376 B1 * | 7/2001 | Borgeaud et al. | 188/71.5 |
| 6,604,612 B1 | 8/2003 | Nagy et al. | |
| 2004/0094375 A1 | 5/2004 | Qian et al. | |

FOREIGN PATENT DOCUMENTS

| | | |
|---|---|---|
| EP | 05 25 6608.0-2423 | 2/2006 |
| FR | 2709522 | 3/1995 |
| WO | 99/21266 | 4/1999 |
| WO | 02/099305 A1 | 12/2002 |

OTHER PUBLICATIONS

European Search Report

* cited by examiner

*Primary Examiner*—Thomas Williams
(74) *Attorney, Agent, or Firm*—Ingrassia Fisher & Lorenz

(57) ABSTRACT

An aircraft brake actuation system includes an actuator for selectively moving to a position that corresponds to a commanded brake force. A cap assembly is coupled to the end of the actuator and is configured to engage an aircraft brake element and supply the commanded brake force to one or more aircraft wheels. The cap assembly is constructed of a low thermal conductivity material and has thermal resistance grooves formed therein. The cap assembly is also configured to compensate for certain undesired tangential movements that may occur during an aircraft brake cycle.

26 Claims, 2 Drawing Sheets

AIRCRAFT BRAKE ACTUATOR THERMAL INSULATOR AND TANGENTIAL MOVEMENT COMPENSATOR

TECHNICAL FIELD

The present invention relates to aircraft brake actuation systems and, more particularly, to a cap assembly that provides thermal insulation and tangential movement compensation for the actuators used in brake actuation systems.

BACKGROUND

When a jet-powered aircraft lands, the aircraft brakes, various aerodynamic drag sources (e.g., flaps, spoilers, etc.), and, in many instances, aircraft thrust reversers, are used to slow the aircraft down in the desired amount of runway distance. Once the aircraft is sufficiently slowed, and is taxiing from the runway toward its ground destination, the aircraft brakes are used slow the aircraft, and bring it to a stop at its final ground destination.

Presently, many aircraft brake systems include a plurality of hydraulic, pneumatic, or electromechanical actuators, and a plurality of wheel mounted brakes. The brakes in many aircraft are implemented as multi-disk brakes, which include a plurality of stator disks and rotor disks. The stator disks and rotor disks may be alternately splined to a torque tube or wheel rim, and disposed parallel to one another, to form a brake disk packet. The actuators, in response to an appropriate pilot-initiated command, move between an engage position and a disengage position. In the engage position, the actuators each engage the brake disk packet, moving the brake disks into engagement with one another, to thereby generate the desired braking force.

As may be appreciated, when the brake actuators engage the brake disk packet, the frictional forces may generate relatively high temperatures in the brake disk packet, especially during aircraft landing. Moreover, after the aircraft lands and then taxis to its ground destination, the actuators may continuously engage the brake disk packet, which may remain at the relatively high temperature for a relatively long period of time. Some actuator components may not be able to withstand the relatively high temperature. Thus, a portion of the actuator may need to be thermally insulated from the relatively hot brake disk packet.

In addition to the above-noted thermal considerations, the actuators may also need to compensate for undesirable structural stresses. For example, during a braking cycle, the actuators may experience relatively large tangential movements due to the structural flexing and subsequent backlash associated with application of the brake force and the concomitant stopping or slowing of the aircraft. These tangential movements may not coincide with the direction in which the braking force being applied, and may result in deterioration and/or damage to the actuator, one or more of its components, and/or one or more other braking system components.

Hence, there is a need for a device, which may be used in an aircraft brake system, that addresses one or more of the above-noted drawbacks/considerations. Namely, a device that can thermally insulate an aircraft brake system actuator, or at least portions thereof, from the relatively high temperatures associated with brake system operations, and/or a device that can compensate brake system actuators for the tangential movements that may occur during the brake cycle of an aircraft brake actuation system. The present invention addresses one or more of these needs.

BRIEF SUMMARY

The present invention embodies a device that provides thermal insulation and tangential movement compensation for the actuators used in brake actuation systems.

In one embodiment, and by way of example only, an aircraft brake actuation system includes a control circuit, a motor, an actuator, and a cap assembly. The control circuit is configured to selectively supply brake force motor command signals representative of a commanded brake force. The motor is coupled to receive the brake force motor command signals from the control circuit and is operable, in response thereto, to supply a rotational drive force. The actuator is coupled to receive the rotational drive force from the motor and is configured, upon receipt thereof, to move to a position that corresponds to the commanded brake force. The cap assembly is coupled to the actuator and is configured to engage an aircraft brake element and supply the commanded brake force thereto. The cap assembly includes a main body, a plurality of roller elements, and a cover. The main body has a first end, which is coupled to the actuator, and a second end, which has a cavity formed therein. The plurality of roller elements are each disposed within the cavity. The cover is movably coupled to the main body and encloses the cavity. The cover is coupled to one or more of the roller elements and has an inner surface, which faces the roller elements, and an opposed outer surface, which is configured to engage the aircraft brake element.

In another exemplary embodiment, an actuator assembly includes a motor, an actuator, and a cap assembly. The motor is configured to supply a rotational drive force. The actuator is coupled to receive the rotational drive force from the motor and is configured, upon receipt thereof, to translate. The cap assembly is coupled to the actuator and is configured to translate therewith. The cap assembly includes a main body, a plurality of roller elements, and a cover. The main body has a first end, which is coupled to the actuator, and a second end, which has a cavity formed therein. The plurality of roller elements are each disposed within the cavity. The cover is movably coupled to the main body and encloses the cavity. The cover is coupled to one or more of the roller elements and has an inner surface, which faces the roller elements, and an opposed outer surface.

In yet another exemplary embodiment, a cap assembly for selectively engaging an aircraft brake element includes a main body, a plurality of roller elements, and a cover. The main body has a first end, which is adapted to couple to an actuator, and a second end, which has a cavity formed therein. The plurality of roller elements are each disposed within the cavity. The cover is movably coupled to the main body and encloses the cavity. The cover is coupled to one or more of the roller elements and has an inner surface, which faces the roller elements, and an opposed outer surface, which is configured to engage the aircraft brake element.

Other independent features and advantages of the preferred thermal insulator and compensation device will become apparent from the following detailed description, taken in conjunction with the accompanying drawings which illustrate, by way of example, the principles of the invention.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background of the invention or the following detailed description of the invention. In this regard, before proceeding with the detailed description, it is to be appreciated that the described embodiment is not limited to use in conjunction with a specific vehicle or brake system. Thus, although the description is explicitly directed toward an embodiment that is implemented in an aircraft brake actuation system, it should be appreciated that it can be implemented in other vehicles and other brake actuation system designs, including those known now or hereafter in the art.

Figure 1:
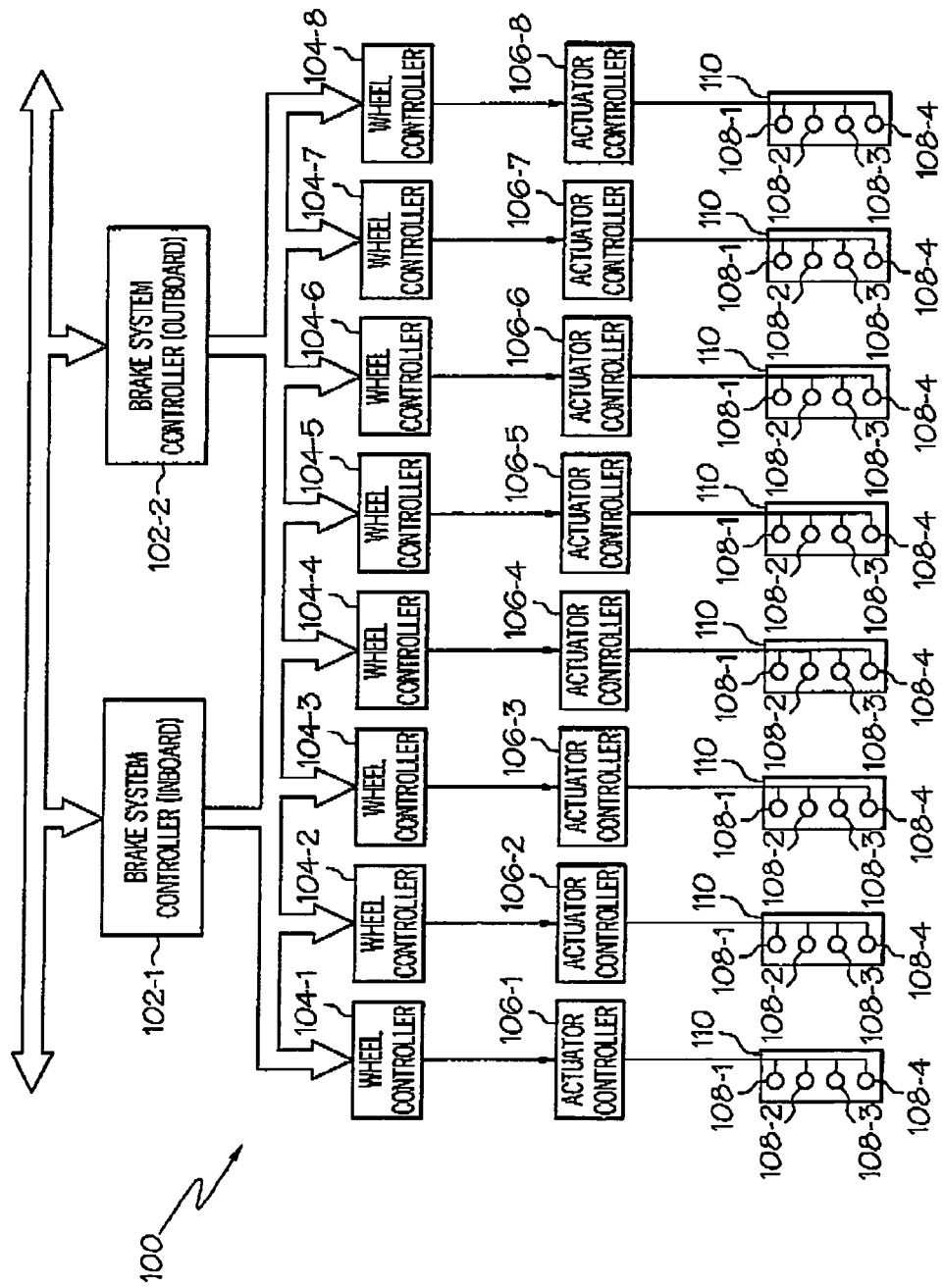
FIG. 1 is a functional block diagram of an exemplary aircraft brake actuation system.

Turning now to the description, and with reference first to FIG. 1, a functional block diagram of an exemplary aircraft brake actuation system 100 is shown. In the depicted embodiment, the system 100 includes a plurality of brake system controllers 102, a plurality of wheel controllers 104, a plurality of actuator controllers 106, and a plurality of brake actuator assemblies 108. To provide redundancy, the system 100 includes two brake system controllers 102, an inboard brake system controller 102-1, and an outboard brake system controller 102-2, though it will be appreciated that it could include more than this number. Each brake system controller 102 receives brake command signals from, for example, brake pedal transducers (not shown) located in an aircraft cockpit (also not shown), which are representative of a desired brake force. The brake system controllers 102 are each configured to process the brake command signals from the transducers, and supply brake processed command signals to each of the wheel controllers 104.

The wheel controllers 104 are each coupled to receive the processed brake command signals supplied from each brake system controller 102 and are operable, in response to the received commands, to supply brake force command signals that are also representative of the desired brake force. In the depicted embodiment, the system 100 includes eight wheel controllers 104-1 through 104-8, though it will be appreciated that it could include more or less than this number depending, for example, on the number of wheels on the vehicle that are to be braked. No matter the specific number of wheel controllers 104 that are used, each wheel controller 104 supplies brake force command signals to one of the actuator controllers 106.

In the depicted embodiment, the system includes eight actuator controllers 106-1 through 106-8, one for each wheel controller 104. It will be appreciated, however, that this is merely exemplary and that the system 100 could be implemented with more or less than this number of actuator controllers 106. In any case, each actuator controller 106, in response to the brake force command signals it receives, supplies brake force actuator command signals to one or more brake actuator assemblies 108. It will be appreciated that the brake force actuator command signals, similar to the brake command signals and the brake force command signals, are representative of the desired brake force.

In response to the brake force actuator command signals, each actuator assembly 108 moves to a position that corresponds to the commanded brake force, to thereby supply the desired brake force to a wheel 110. In the depicted embodiment, the system 100 is configured to be used with an aircraft that includes up to eight wheels 110, with four brake actuator assemblies 108-1, 108-2, 108-3, 108-4 per wheel 110 supplying the commanded brake force thereto. Thus, the system 100 may include up to a total of thirty-two brake actuator assemblies 108. It will be appreciated that this is merely exemplary of a particular embodiment, and that the system 100 could be configured to include more or less than this number of brake actuator assemblies 108.

Figure 2:
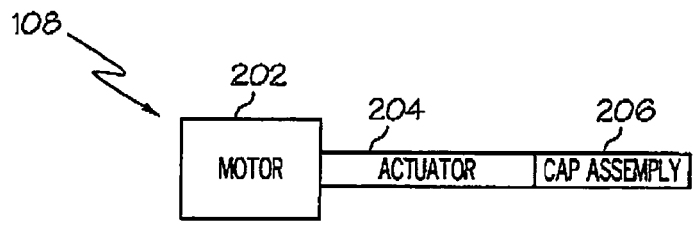
FIG. 2 is a perspective view of a physical implementation of an exemplary embodiment of a brake actuator assembly that may be used in the system of FIG. 1, and that may include a cap assembly of the present invention.

Turning now to FIG. 2, a simplified diagram of an exemplary physical embodiment of the brake actuator assembly 108 that may be used with the system 100 is shown and will now be briefly described. The depicted actuator assembly 108 includes a motor 202, an actuator 204, and a cap assembly 206. The motor 202 receives the brake force actuator command signals from one of the actuator controllers 108 and, in response, rotates in the commanded direction to supply a rotational drive force. The motor 202 may be any one of numerous types of motors including, for example, hydraulic, pneumatic, and electric motors, the motor 202 is preferably an electric motor. Moreover, although the motor 202 may be implemented as any on of numerous types of electric motors, in a particular preferred embodiment, it is implemented as a brushless DC motor. No matter the particular type of motor 202 that is used, the rotational drive force supplied thereby is used to rotate the actuator 204.

The actuator 204 is coupled to receive the rotational drive force from the motor 202 and, in response thereto, to translate to a position that corresponds to the commanded brake force. The actuator 204 may be any one of numerous actuators that exhibit this functionality, but in a particular preferred embodiment the actuator 204 is a ballscrew-type actuator. As is generally known, a ballscrew actuator typically includes an inner, externally-threaded ballscrew, and an external, internally-threaded ballnut, neither of which is illustrated. A plurality of balls, which are also not illustrated, are disposed in the threads between the ballscrew and ballnut.

The ballscrew-type actuator 204 converts the rotational drive force received from the motor 202 to translational motion in one of two ways, depending upon its configuration. In a first configuration, the ballscrew is configured to rotate and receives the rotational drive force from the motor, and the ballnut is anti-rotated. Thus, upon receipt of the rotational drive force, the ballscrew will rotate and the ballnut will translate. In a second configuration, the ballscrew is configured to translate, and the ballnut, while being fixed axially, is configured to rotate and receives the rotational drive force from the motor. Thus, upon receipt of the rotational drive force, the ballnut will rotate and the ballscrew will translate. It will be appreciated that these two ballscrew-type actuator configurations are merely exemplary, and that various other configurations may be used.

No matter the particular type or configuration of the actuator 204, as FIG. 2 additionally shows, the cap assembly 206 is coupled to an end thereof, and thus translates therewith. The cap assembly 206 engages an aircraft brake element (not shown) in its associated wheel 110, and supplies the commanded brake force thereto. The cap assembly 206, which will now be described in more detail, is constructed and configured to provide both thermal insulation and tangential movement compensation for the actuator 204 to which it is coupled.

Figure 3:
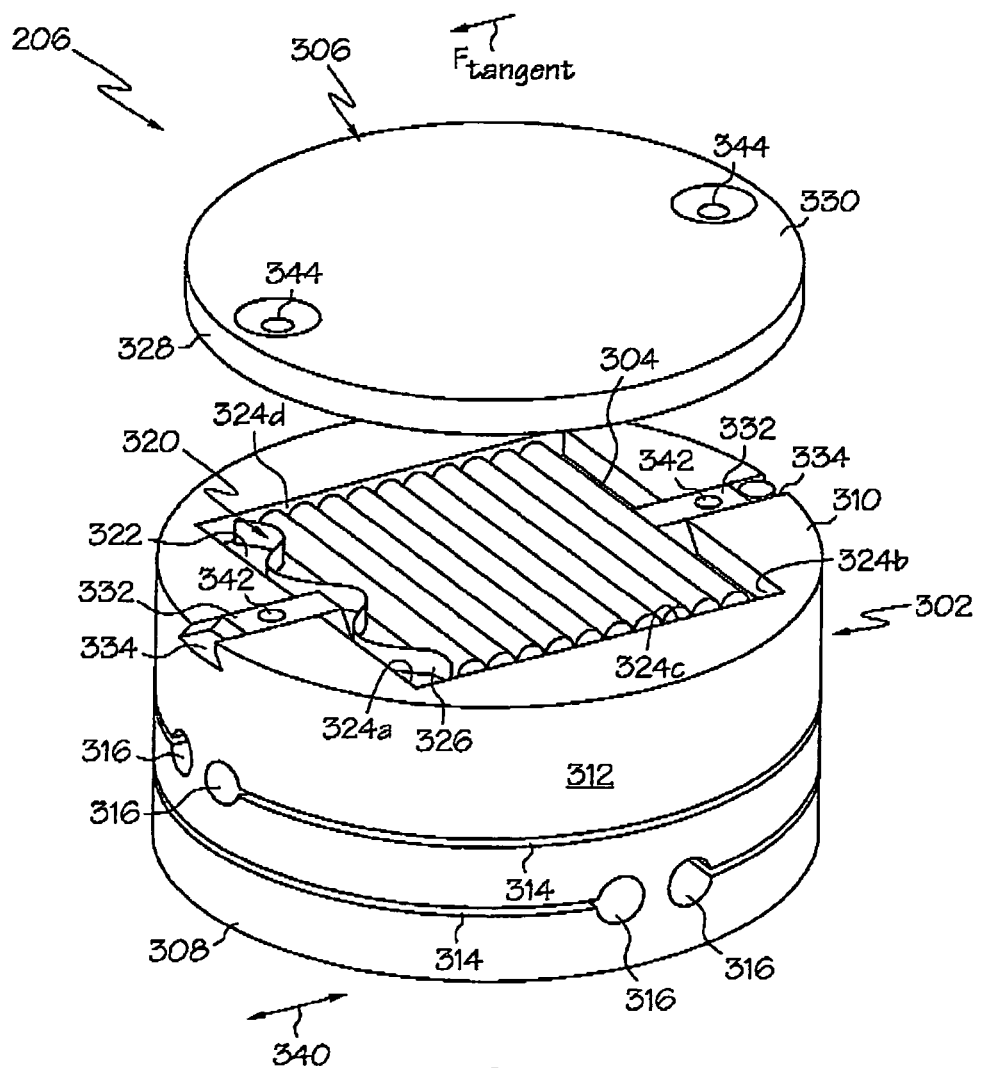
FIG. 3 is an exploded perspective view of an exemplary embodiment of a cap assembly that may be used with the actuator assembly of FIG. 2.

With reference to FIG. 3, a particular preferred embodiment of the cap assembly 206 is shown and will now be described in more detail. The cap assembly 206 includes main body 302, a plurality of rollers 304, and a cover 306. The main body 302 has a first end 308, a second end 310, and an outer peripheral surface 312. The main body 302 is preferably made of a material with low thermal conductivity and high temperature strength properties, to thereby provide at least some thermal insulation for the actuator 204. It will be appreciated that any one of numerous suitable materials may be used including, for example, Inconel, Molybdenum (such as TZM), and Cobalt alloys (such as HS25). In a particular preferred embodiment, however, a non-metallic ceramic material, such as silicon is used.

In addition to selecting a material having low thermal conductivity, the main body 302 is also configured to reduce thermal conduction. In particular, a plurality of thermal resistance grooves 314 are formed in the main body outer peripheral surface 312. The thermal resistance grooves 314 extend from the outer peripheral surface 312 and extend partially into the main body 302. The thermal resistance grooves 314 further limit thermal conduction through the main body 302 by limiting the thermal conduction path.

In addition to providing thermal resistance, the thermal resistance grooves 314 also provide some compliance for unwanted movements that may occur during a braking cycle and/or as a result of non-perpendicularity issues that may arise in portions of the cap assembly 206 or the non-illustrated aircraft brake element. In the depicted embodiment, the thermal resistance grooves 314 each include a section 316 that is configured to inhibit stress risers in the main body 302. In particular, the sections 316 are each preferably cylindrically shaped. It will be appreciated that although the main body outer peripheral surface 312 is shown as having a generally cylindrical shape, this is merely exemplary and that the outer peripheral surface 312 may be defined in any one of numerous other shapes.

No matter the particular size, shape, or material of construction, the main body 302 is coupled to the actuator 204 via the first end 308, and a cavity 320 is formed in the main body second end 310. In the depicted embodiment, the cavity 320 includes a substantially square bottom surface 322 and, first, second, third, and fourth substantially rectangular side surfaces 324a–d. The plurality of roller elements 304 are disposed within the cavity 320. Preferably, the roller elements 304 rest against the bottom surface 322 of the cavity 320, and are sized to extend slightly outside of the cavity 320. The roller elements 304 may be implemented in any one of numerous configurations, but in the depicted embodiment the roller elements 304 are implemented as a plurality of individual roller pins disposed in a single row.

The roller pins 304 are disposed substantially freely within the cavity 320, and are configured, upon receipt of appropriate force, to roll between the first 324a and second 324b side surfaces. However, the roller pins 304 are biased toward second side surface 324b. In the depicted embodiment, a spring 326 supplies the force that biases the roller elements 304 toward the second side surface 324b when high axial load is not present. The spring 326 is disposed between the first side surface 324a and one of the end roller pins 304 in the row of roller pins 304.

The cover 306 is movably coupled to the main body 302 and captures the roller pins 304 and the spring 326 within the cavity 320. Alternatively, the spring 326 could be coupled to one or more cavity side surfaces 324c, 324d, or held in the cavity 320 via friction forces. More specifically, the cover 306 has an inner surface 328 and an opposed outer surface 330. The inner surface 328 faces the main body second end 310, and a portion thereof is coupled to, and more preferably engages, each of the roller pins 304. The cover outer surface 330 is what engages the aircraft brake element.

As was noted in the preceding paragraph, the cover 306 is movably coupled to the main body 302. It will be appreciated that this may implemented in any one of numerous ways, but in the depicted embodiment the cover 306 is coupled to a plurality of movable sliders 332, which are movably disposed, one each, within a plurality of slots 334. The slots 334 are formed in the main body second end 310, and each includes two opposed ends. One of the ends of each slot 334 is disposed proximate one of the two opposing cavity side surfaces 324a, 324b, and the other ends are disposed a predetermined distance therefrom.

The sliders 332 are each retained within one of the slots 334 in a manner that allows constrained movement. In particular, the sliders 332 are retained in a manner that allows each to move within the slots 334 in a direction indicated by arrow 340, but not in a direction perpendicular thereto. The sliders 332 each include a fastener opening 342 that is configured to receive a non-illustrated fastener. The cover 306 additionally includes a plurality of substantially collocated fastener openings 344 that extend between the cover inner 328 and outer 330 surfaces. Thus, in the depicted embodiment the cover 306 is movably coupled to the main body second end 310 via a plurality of fasteners such as, for example, threaded fasteners, that extend through the cover fastener openings 344, and into the slider fastener openings.

With the above described configuration, if a force (F) is applied to the cover 306 that has a component ($F_{tangent}$) in a direction tangent to the cover outer surface 330, such as may occur as a result of a brake cycle backlash, the cover 306 will move in the direction of the tangential force component ($F_{tangent}$), if the magnitude of the tangential force component ($F_{tangent}$) exceeds the spring bias force. This is because the cover inner surface 328 engages the plurality of roller pins 304 and is movably coupled, via the sliders 332, to the main body 302. As the cover 306 translates, the roller pins 304 will roll in the same direction (e.g., toward the cavity first side surface 324a) against the bias force of the spring 326. When the brake force is subsequently released, the spring 326 biases the roller pins 304 back toward the cavity second side surface 324b, which also supplies a force that moves the cover 306 back to its original position. This tangential movement compensation takes place even during the high axial load that is produced by the actuator 204 during an aircraft braking operation.

The cap assembly 206 described herein provides thermal insulation and tangential movement compensation for the actuators 204 used in a brake actuation system 100. Thus, the actuators 204 and the various individual components in the actuators 204 are less likely to be subject to the potentially extreme temperatures associated with an aircraft braking operation. Moreover, the actuators 204 are less likely to be subject to potentially damaging tangential forces that may occur during an aircraft braking operation.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An aircraft brake actuation system, comprising:
   a control circuit configured to selectively supply brake force motor command signals representative of a commanded brake force;
   a motor coupled to receive the brake force motor command signals from the control circuit and operable, in response thereto, to supply a rotational drive force;
   an actuator coupled to receive the rotational drive force from the motor and configured, upon receipt thereof, to move to a position that corresponds to the commanded brake force; and
   a cap assembly coupled to the actuator and configured to engage an aircraft brake element and supply the commanded brake force thereto, the cap assembly including:
      a main body having a first end and a second end, the main body first end coupled to the actuator, the main body second end having a cavity formed therein, the cavity including at least a first end and an opposed second end,
      a plurality of roller elements disposed within the cavity,
      a spring disposed within the cavity proximate the cavity first end, the spring configured to bias the roller elements toward the cavity second end, and
      a cover movably coupled to the main body and at least partially enclosing the cavity, the cover coupled to one or more of the roller elements and having an inner surface and an opposed outer surface, the inner surface facing the roller elements and the outer surface configured to engage the aircraft brake element.

2. The system of claim 1, wherein the cap assembly further includes:
   a first slot and a second slot formed in the main body second end, each slot having at least a first end and an opposed second end, the first and second slot first ends disposed proximate the cavity first and second ends, respectively; and
   a first slider and a second slider disposed at least partially within the first slot and second slot, respectively, and configured to move in a direction that is perpendicular to the main body second end, the first and second sliders each coupled to the cover.

3. The system of claim 1, wherein each of roller elements is a roller pit.

4. The system of claim 3, wherein
   the cavity includes a bottom surface, a first side surface, a second side surface, a third side surface, and a fourth side surface;
   the roller pins are disposed in the cavity and are configured to selectively roll on the bottom surface thereof.

5. The system of claim 4, further comprising:
   a spring disposed within the cavity proximate the cavity first side surface and is configured to bias the roller pins toward the cavity second side surface.

6. The system of claim 1, wherein the main body further includes:
   an outer peripheral surface disposed between the main body first and second ends; and
   one or more grooves formed in the main body and extending partially into the main body from the outer peripheral surface.

7. The system of claim 6, wherein the one or more grooves are configured to:
   limit thermal conduction through the main body, and
   provide compliance to the main body.

8. The system of claim 6, wherein:
   each of the one or more grooves includes a section thereof that is configured to at least inhibit stress risers in the main body.

9. The system of claim 1, wherein the main body is formed of a low thermal conductivity, high temperature strength material selected from the group consisting of a metal and a ceramic.

10. An actuator assembly, comprising:
    a motor configured to supply a rotational drive force;
    an actuator coupled to receive the rotational drive force from the motor and configured, upon receipt thereof, to translate; and
    a cap assembly coupled to the actuator and configured to translate therewith, the cap assembly including:
       a main body having a first end and a second end, the main body first end coupled to the actuator, the main body second end having a cavity formed then the cavity including at least a first end and an opposed second end,
       a plurality of roller elements disposed within the cavity,
       a spring disposed within the cavity proximate the cavity first end, the spring configured to bias the roller elements toward the cavity second end, and
       a cover movably coupled to the main body and enclosing the cavity, the cover coupled to one or more of the roller elements and having an inner surface facing the roller elements and an opposed outer surface.

11. The actuator assembly of claim 10, wherein the main body is formed of a low thermal conductivity, high temperature strength material selected from the group consisting of a metal and a ceramic.

12. The actuator assembly of claim 10, wherein the cap assembly further includes:
    a first slot and a second slot formed in the main body second end, each slot having at least a first end and an opposed second end, the first and second slot first ends disposed proximate the cavity first and second ends, respectively, and
    a first slider and a second slider disposed at least partially within the first slot and second slot, respectively, and configured to move in a direction that is perpendicular to the main body second end, the first and second sliders each coupled to the cover.

13. The actuator assembly of claim 10, wherein each of roller elements is a roller pin.

14. The actuator assembly of claim 13, wherein:
    the cavity includes a bottom surface, a first side surface, a second side surface, a third side surface, and a fourth side surface;
    the roller pins are disposed in the cavity and are configured to selectively roll on the bottom surface thereof.

15. The actuator assembly of claim 14, further comprising:
    a spring disposed within the cavity proximate the cavity first side surface and is configured to bias the roller pins toward the cavity second side surface.

16. The actuator assembly of claim 10, wherein the main body further includes:

an outer peripheral surface disposed between the main body first and second ends; and one or more grooves formed in the main body and extending partially into the main body from the outer peripheral surface.

17. The actuator assembly of claim 16, wherein the one or more grooves are configured to:

limit thermal conduction through the main body; and provide compliance to the main body.

18. The actuator assembly of claim 16, wherein:

each of the one or more grooves includes a section thereof that is configured to at least inhibit stress risers in the main body.

19. A cap assembly for selectively engaging an aircraft brake element, comprising:

a main body having a first end and a second end, the main body first end adapted to couple to an actuator, the main body second end having a cavity formed therein, the cavity including at least a first end and an opposed second end;

a plurality of roller elements disposed within the cavity, a spring disposed within the cavity proximate the cavity first end, the spring configured to bias the roller elements toward the cavity second end; and a cover movably coupled to the main body and enclosing the cavity, the cover coupled to one or more of the roller elements, and having an inner surface and an opposed outer surface, the inner surface facing the roller elements and the outer surface configured to engage the aircraft brake element.

20. The cap assembly of claim 19, wherein each of roller elements is a roller pin.

21. The cap assembly of claim 20, wherein:

the cavity includes a bottom surface, a first side surface, a second side surface, a third side surface, and a fourth side surface;

the roller pins are disposed in the cavity and are configured to selectively roll on the bottom surface thereof.

22. The cap assembly of claim 19, wherein the main body further includes:

an outer peripheral surface disposed between the main body first and second ends; and one or more grooves formed in the main body and extending partially into the main body from the outer peripheral surface.

23. The cap assembly of claim 22, wherein the one or more grooves are configured to:

limit thermal conduction through the main body; and provide compliance to the main body.

24. The cap assembly of claim 22, wherein:

each of the one or more grooves includes a section thereof that is configured to at least inhibit stress risers in the main body.

25. The cap assembly of claim 19, wherein the main body is formed of a low thermal conductivity, high temperature strength material selected from the group consisting of a metal and a ceramic.

26. The cap assembly of claim 19, wherein the cap assembly further includes:

a first slot and a second slot formed in the main body second end, each slot having at least a first end and an opposed second end, the first and second slot first ends disposed proximate the cavity first and second ends, respectively; and a first slider and a second slider disposed at least partially within the first slot and second slot, respectively, and configured to move in a direction that is perpendicular to the main body second end, the first and second sliders each coupled to the cover.

* * * * *

UNITED STATES PATENT AND TRADEMARK OFFICE
CERTIFICATE OF CORRECTION

PATENT NO. : 7,093,696 B2 Page 1 of 1
APPLICATION NO. : 10/973572
DATED : August 22, 2006
INVENTOR(S) : Quitmeyer et al.

It is certified that error appears in the above-identified patent and that said Letters Patent is hereby corrected as shown below:

Column 8, line 25, "then the" should be changed to --therein,--

Signed and Sealed this

Tenth Day of April, 2007

JON W. DUDAS
*Director of the United States Patent and Trademark Office*